(12) United States Patent
Mader et al.

(10) Patent No.: US 7,003,272 B1
(45) Date of Patent: Feb. 21, 2006

(54) RADIO APPARATUS WITH ADJUSTABLE RECEPTION QUALITY

(75) Inventors: Thomas Mader, Hildesheim (DE);
Gerhard Kottschlag, Hildesheim (DE);
Gerhard Pitz, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/380,165

(22) PCT Filed: Nov. 8, 1997

(86) PCT No.: PCT/DE97/02611

§ 371 (c)(1),
(2), (4) Date: Feb. 23, 2000

(87) PCT Pub. No.: WO98/39862

PCT Pub. Date: Sep. 11, 1998

(30) Foreign Application Priority Data

Mar. 3, 1997 (DE) ................................. 197 08 490

(51) Int. Cl.
*H04B 1/06* (2006.01)
*H04B 7/00* (2006.01)
*H04B 17/00* (2006.01)
*H04B 1/10* (2006.01)

(52) U.S. Cl. .................... 455/254; 455/296; 455/226.3

(58) Field of Classification Search ............ 455/226.1, 455/226.3, 250.1, 254, 343.1, 295, 296, 307, 455/70, 558, 63, 218, 219, 220, 234.1, 240.1
See application file for complete search history.

(56) References Cited

U.S. PATENT DOCUMENTS

| | | | | |
|---|---|---|---|---|
| 3,947,636 A | * | 3/1976 | Edgar | 381/94.4 |
| 4,021,739 A | * | 5/1977 | Baum et al. | 375/317 |
| 4,193,055 A | * | 3/1980 | Barnum | 367/94 |
| 4,270,222 A | * | 5/1981 | Menant | 455/236.1 |
| 4,357,712 A | * | 11/1982 | Kawakami | 455/161.3 |
| 4,430,609 A | * | 2/1984 | Van Kessel et al. | 323/350 |
| 4,654,884 A | * | 3/1987 | Sakai et al. | 455/183.2 |
| 4,856,082 A | * | 8/1989 | Kasa | 455/161.2 |
| 5,119,508 A | * | 6/1992 | Shamasundara | 455/234.1 |
| 5,175,883 A | * | 12/1992 | Ueno | 455/242.2 |
| 5,265,270 A | * | 11/1993 | Stengel et al. | 455/343.2 |
| 5,268,689 A | * | 12/1993 | Ono et al. | 342/20 |
| 5,339,455 A | * | 8/1994 | Vogt et al. | 455/266 |
| 5,369,803 A | * | 11/1994 | Hirasawa et al. | 455/571 |

(Continued)

*Primary Examiner*—Nick Corsaro
*Assistant Examiner*—Raymond B. Persino
(74) *Attorney, Agent, or Firm*—Michael J. Striker

(57) ABSTRACT

A radio apparatus (95), particularly for mobile radio, which makes it possible to adjust the signal reception in a predeterminably optimized way is proposed. The radio apparatus (95) includes a receiver part (1) and an evaluation unit (5), which controls the sensitivity and/or the signal-to-noise ratio of the receiver part (1) as a function of a predeterminable signal reception quality and the actual signal reception. In the event of defective signal reception, the evaluation unit (5) increases the sensitivity and/or the signal-to-noise ratio of the receiver part (1), and when signal reception is error-free for a predeterminable time it reduces the sensitivity and/or the signal-to-noise ratio of the receiver part (1).

17 Claims, 2 Drawing Sheets

U.S. PATENT DOCUMENTS

| | | | |
|---|---|---|---|
| 5,390,345 A * | 2/1995 | Wada et al. | 455/234.1 |
| 5,428,638 A * | 6/1995 | Cioffi et al. | 455/522 |
| 5,450,622 A * | 9/1995 | Vandegraaf | 455/222 |
| 5,526,398 A * | 6/1996 | Okada et al. | 455/426.1 |
| 5,541,985 A * | 7/1996 | Ishii et al. | 379/111 |
| 5,590,156 A * | 12/1996 | Carney | 375/316 |
| 5,722,061 A * | 2/1998 | Hutchison et al. | 455/245.1 |
| 5,761,614 A * | 6/1998 | Leitch et al. | 455/254 |
| 5,819,167 A * | 10/1998 | Lawrence | 455/254 |
| 5,831,256 A * | 11/1998 | De Larminat et al. | 235/486 |
| 5,903,818 A * | 5/1999 | Kobayashi | 340/7.44 |
| 5,953,646 A * | 9/1999 | Hirasawa | 455/343.2 |

* cited by examiner

RADIO APPARATUS WITH ADJUSTABLE RECEPTION QUALITY

BACKGROUND OF THE INVENTION

The invention is based on a radio apparatus provided with a receiver part.

Radio apparatuses that are provided with a receiver part for signal reception from radio stations are already known.

SUMMARY OF THE INVENTION

The radio apparatus of the invention has the advantage over the prior art that the quality of the actual signal reception can be adapted to a signal reception quality that can for instance be predetermined by the user. In this way, the reception quality of the radio apparatus can be adjusted individually as needed.

It is especially advantageous that in the event of defective signal reception, the evaluation unit increases the sensitivity and/or signal-to-noise ratio, particularly in the event of neighboring channel disturbance or intermodulation, of the receiver part, and in the event of error-free signal reception for a predetermined time lowers the sensitivity and/or signal-to-noise ratio of the receiver part. In this way, especially in good reception conditions, energy can be saved, so that the service life of a battery in the radio apparatus is increased.

It is also advantageous to use at least one add-on reception amplifier, which the evaluation unit adds in the event of defective signal reception and bypasses in the event of error-free signal reception. This provides an especially simple opportunity of varying the sensitivity of the receiver part, which particularly in the case of error-free signal reception leads to a considerable electrical saving.

It is also advantageous that the receiver part has at least one mixer, and that the evaluation unit, in the event of defective signal reception, increases the power supply of the at least one mixer to a first pre-determined value and in the event of error-free signal reception reduces it to a second predetermined value. In this way an especially simple possibility for varying the signal-to-noise ratio and in particular the intermodulation performance of the receiver part is provided, in which the power consumption can be reduced considerably, especially for error-free signal reception.

It is also advantageous that the receiver part includes at least one first filter configuration and one second filter configuration, and that the evaluation unit switches over to the first filter configuration in the event of defective signal reception and to the second filter configuration in the event of error-free signal reception. In this way, depending on whether neighboring channel filtration is especially important or interference in the useful channel has to be blanked out, it is possible to select that filter configuration which is more suitable for a given case, so that as a result, it is easy to optimize the quality of the signal reception.

It is also advantageous that an operating mode is provided in which the evaluation unit increases the sensitivity and/or the signal-to-noise ratio of the receiver part to a maximum value. In this way, a switchover to maximum sensitivity and/or signal-to-noise ratio of the receiver part can be made at any time, if power consumption is not crucial, such as for testing purposes.

It is also advantageous that and that the operating mode can be established as a function of a chip card detected in the insertion slot by the card reader. In this way, for an equipment test, the performance of the receiver part of the radio apparatus can be checked with the aid of the chip card. At the same time, the chip card can perform the function of access authorization for testing purposes.

A further advantage is that the operating mode can be established at the radio apparatus, preferably by a key on the radio apparatus. This is an especially simple provision for adjusting the maximum performance of the receiver part of the radio apparatus.

Still another advantage is that the operating mode can be established at the radio apparatus as a function of a request by a base station, preferably for sending back a signal sent previously to the radio apparatus. In this way, the receiver part of the radio apparatus is adjusted automatically, for instance for testing purposes initiated by the base station, to the best possible reception quality.

It is furthermore advantageous that the operating mode can be established upon detection of an external power supply, in particular via a power supply adapter, and/or of a connected external antenna. In this case, power saving provisions in the radio apparatus can be dispensed with in favor of improved signal reception, since an external power supply is available, or above all if a connected external antenna is detected, it can be concluded that the radio apparatus is being used in a motor vehicle, so that it can be expected that the radio cells involved will change faster than when the radio apparatus is being used on foot, and the radio apparatus must therefore be adjusted to the best possible reception quality. On the basis of the detection, the establishment of this operating mode can be made automatically, or in other words without any action on the part of the user.

It is also advantageous that a sensor is provided, and that the operating mode can be established as a function of a measured value ascertained by the sensor. This affords a further simple possibility of adjusting the receiver part of the radio apparatus automatically to the best possible signal reception. Depending on the type of sensor selected, virtually arbitrary measurement variables can be made the basis for the establishment of this operating mode.

Another advantage [verb missing] in that the sensor detects the charge of a battery connected to the radio apparatus and that the operating mode can be established as a function of the charge of the battery detected by the sensor. In this way it is assured that a switchover to high power consumption in the receiver part of the radio apparatus is made only whenever the voltage made available by the battery does not break in excessively strongly.

Another advantage is that an interface is provided for connecting a data processing unit, and that the operating mode can be established as a function of data transmitted to the radio apparatus via the interface. In this way, the reception quality of the receiver part of the radio apparatus can be controlled and programmed from outside by the user.

BRIEF DESCRIPTION OF THE DRAWING

One exemplary embodiment of the invention is shown in the drawing and described in further detail in the ensuing description.

DESCRIPTION OF THE PREFERRED EMBODIMENT

Figure 1:
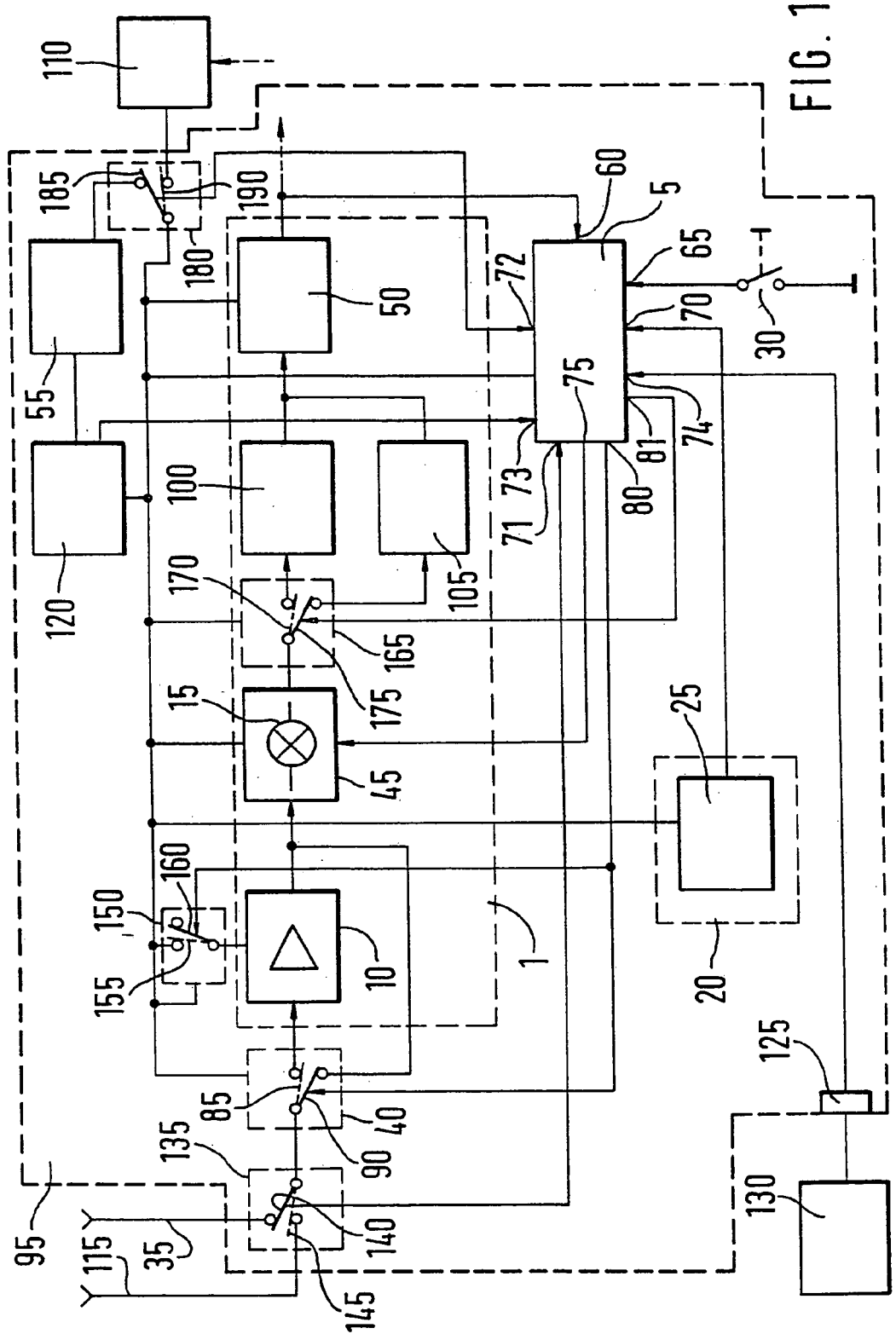
FIG. 1 shows a block circuit diagram of a radio apparatus of the invention.

In FIG. 1, reference numeral 35 identifies a first receiving antenna of a radio apparatus 95 intended for mobile radio. The receiving antenna 35 can be connected via a first switch 135 and a first switch position 140 to a second switch 40 that is controllable. Via the first switch 135, in a second switch position 145, a second receiving antenna 115 can be connected to the second switch 40. Via the second switch 40, in a first switch position 85, the input of a pd 10 of a receiver part 1 of the radio apparatus 95 can be connected to the receiving antenna 35, 115 connected via the first switch 135. The receiver part 1 further includes a demodulator 45, connected on the input side to the output of a reception amplifier 10; along with other component groups not shown, the demodulator also includes a mixer 15. The output of the demodulator 45 can be connected via a third switch 165 in a first switch position 170 to the input of a first filter configuration 100 and in a second switch position 175 to the input of a second filter configuration 105. The output of the first filter configuration 100 and the output of the second filter configuration 105 are interconnected and are connected to the input of a decoder 50, which like the two filter configurations 100, 105 is also disposed in the receiver part 1 and which can be connected at its output, in a manner known to one skilled in the art, to further receiving components of the radio apparatus, as is indicated by the arrow drawn in dashed lines in FIG. 1 at the output of the decoder 50. The output of the decoder 50 is also connected to a first input 60 of an evaluation unit 5. A second input 65 of the evaluation unit 5 can be connected to a reference potential via a pushbutton switch 30. A third input 70 of the evaluation unit 5 is connected to a card reader 25, which is disposed in an insertion slot 20 of the radio apparatus 95. Via a fourth input 71 of the evaluation unit 5, the first switch 135 is connected to the evaluation unit 5 so that its switch position can be detected. Via a battery 55, the second switch 40, the reception amplifier 10, the demodulator 40 with the mixer 15, the third switch 165, the decoder 50, the evaluation unit 5, and the card reader 25 can all be supplied with current. The power supply can be delivered to the reception amplifier 10 via a fourth switch 150 and a first switch position 155, while conversely in a second switch position 160 of the fourth switch 150 the reception amplifier 10 can be disconnected from the power supply. The fourth switch 150 can also be supplied with current from the battery 55. For supplying power, the battery 55 can be connected to the applicable components via a fifth switch 180 in a first switch position 185. The power supply can also be provided externally, however, for instance via the car radio and a motor vehicle, or in general via a power supply adapter 110 for mains operation; the connection with the mains is represented in FIG. 1 by an arrow drawn in dashed lines at one input of the power supply adapter 110. For connection of the external power supply, the power supply adapter 110 is connected to the components to be supplied, in a second switch position 90 of the fifth switch 180. A sensor 120 for detecting the charge status of the battery 55 is connected to the battery 55 and is likewise supplied with current from the battery 55 or the power supply adapter 110, depending on the switch position, via the fifth switch 180. Since the sensor 120 is used only for detecting the charge status of the battery 55, it also suffices to provide the power supply of the sensor 120 only via the battery 55. The fifth switch 180 is connected to the evaluation unit 5 via a fifth input 72, and the sensor 120 is connected to the evaluation unit 5 via a sixth input 73. An external data processing unit 130 is connected to the evaluation unit 5 via an interface 125 and a seventh input 74. The battery 55 or the power supply adapter 110 also takes on the task of power supply to other reception components, not shown in FIG. 1. The evaluation unit 5 has a first output 75 for controlling the power supply to the mixer 15, a second output 80 for controlling the switch positions of the second and fourth controllable switches 40, 150, and a third output 81 for controlling the switch positions of the also-controllable third switch 165. In a second switch position 90, the second switch 40 connects the receiving antenna 35, 115, connected accordingly via the first switch 135, directly to the output of the reception amplifier 10 and thus to the input of the demodulator 45, so that the reception amplifier 10 is thereby bypassed.

Figure 2:
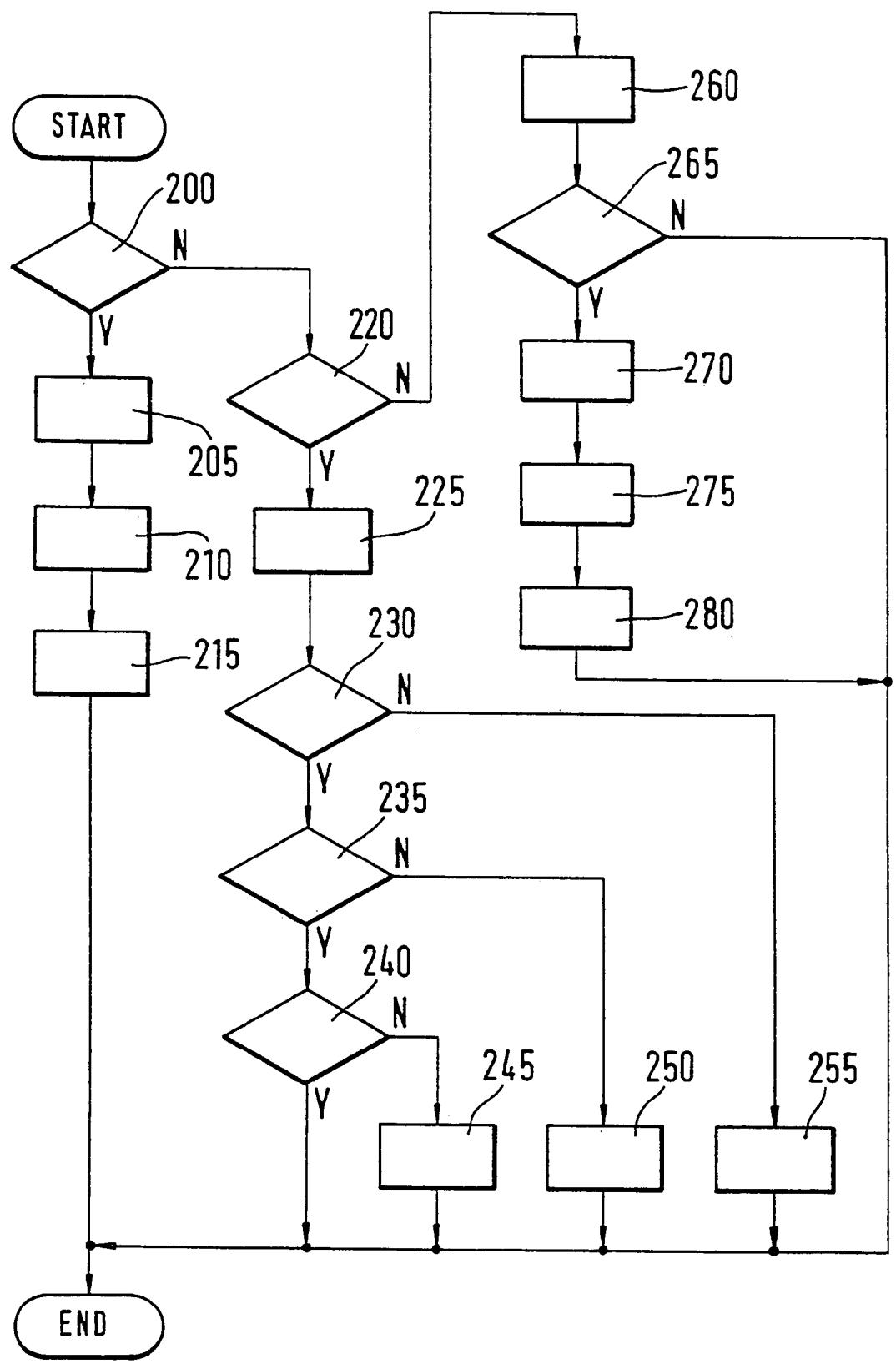
FIG. 2 is a flow chart for an edt of the radio apparatus.

The mode of operation of the evaluation unit 5 will be explained in detail in terms of a flow chart in FIG. 2. The flow chart is run through each time a pulse train, also known as a burst, is received. A global variable is introduced that contains the number of successive uninterrupted bursts received without error. This global variable is initialized with zero the first time the flow chart of FIG. 2 is run through, and at the same time the second switch 40 and the fourth switch 150 are each in their respective second switch position 90, 160; the power supply to the mixer 15 is reduced to a second predetermined value, and the third switch 165 is in its second switch position 175. A constant is also provided, which indicates the number of uninterrupted bursts received successively without error after which the receiver part 1 can be operated in a power-saving mode. This constant thus specifies a length of time after which, in the event of error-free signal reception, the sensitivity and/or the signal-to-noise ratio of the receiver part 1 can be reduced.

At a program point 200, the evaluation unit 5 asks whether the card reader 25 in the insertion slot 20 detects a chip card; on the one hand, this realizes an access authorization for the radio apparatus, and on the other it provides for the switchover to an operating mode for testing purposes. Also at this program point 200, the question is asked whether the second input 65 of the evaluation unit 5 has been connected to the reference potential via the pushbutton switch 30. The switch position of the first switch 135 and the switch position of the fifth switch 180 are also checked. In this process the question is asked whether the second receiving antenna 115 has been connected to the radio apparatus 95, and whether the radio apparatus 95 is being supplied with current externally via the power supply adapter 110. The question is also asked whether the establishment of the operating mode for test purposes has been arranged by the data processing unit 130. By the evaluation of the signal decoded by the decoder 50, the question is furthermore asked in the evaluation unit 5 whether a base station has requested the operating mode for test purposes on the part of the radio apparatus 95, in which the radio apparatus 95 in a so-called echo mode sends a signal, sent previously from the base station to the radio apparatus 95, back to the base station again for test purposes. Furthermore, by means of the measured signal from the sensor 120, the question is asked in the evaluation unit 5 whether, at an established first switch position 185 of the fifth switch 180, there is still a sufficient charge in the battery 55 in order to switch over to high power consumption, without the supply voltage breaking in excessively strongly. If with a sufficient charge in the battery 55 or with the power supply adapter 110 connected at least one of the above conditions is met, then a jump is made to program point 205; if not, a jump is made to program point 220. At program point 205, the second switch 40 and the fourth switch 150 are switched over by the evaluation unit 5 to the respective first switch position 85, 155, and as a result the reception amplifier 10 in the receiver part 1 is added, unless it had already been added. In this way, the evaluation unit 5 increases the sensitivity of the receiver part 1 to a maximum value. At program point 210, the power supply of the mixer 15 is raised by the evaluation unit 5 to a first predetermined value, unless this power supply had already been set to that value. In this way, the intermodulation strength of the receiver part 1 is raised to a maximum value, or in other words interference in the useful channel is minimized. At program point 215, the third switch 165 is switched over by the evaluation unit 5 to its first switch position 170, and as a result the first filter configuration 100 is switched into the reception signal path, if the first filter configuration 100 has not already been switched into the signal reception path. In this way, the signal-to-noise ratio of the receiver part 1 is increased still further, because neighboring channel interference and interference in the useful channel are largely blanked out in the selected first filter configuration 100. Depending on the test situation, this task may also be performed better by the second filter configuration 105, or by other filter configurations, not shown in FIG. 1, that can be added via the third switch 165. The evaluation unit 5 must cause the switch position to be established at the third switch 165 as a function of the test situation prevailing, which it can be informed of for instance by the data processing unit 130 or by the base station. Thus after program step 215 has been executed, the radio apparatus 95 can be tested at maximum performance of its receiver part 1. An exit from the program is then made. At program point 220, the question is asked whether the burst received most recently was erroneous. If so, then a jump is made to program point 225, and if not, to program point 260. At program point 225, the global variable is reset to zero. At program point 230, the question is asked whether at the second output 80 of the evaluation unit 5 a control signal is present which keeps the second switch 40 and the fourth switch 150 in its respective first switch position 85, 155. If so, a jump to program point 235, and if not to program point 255, is made. At program point 235, the question is asked whether the power supply of the mixer 15 has been raised to the first predetermined value by the evaluation unit 5. If so, then a jump to program point 240 is made, and if not then to program point 250. In program point 240, the question is asked whether at the third output 1 of the evaluation unit 5 a control signal is present which keeps the third switch 165 in its first switch position 170. If so, an exit from the program is made; if not, a jump is made to program point 245. At program point 245, the evaluation unit 1 causes the third switch 165 to switch over to its first switch position 170. Depending on the test situation, some other filter configuration instead of the first filter configuration 100 may be better suited to increasing the reception quality, so that a switchover is made as described above to whichever is the best suited filter configuration. For the present exemplary embodiment, it will always be assumed that this is true for the first filter configuration 100. After program point 245, an exit from the program is made. At program point 250, the power supply of the mixer 15 is raised by the evaluation unit 5 to the first predetermined value. An exit from the program is then made. At program point 255, the evaluation unit 5 causes the second switch 40 and the fourth switch 150 to switch over into its respective first switch position 85, 155. An exit from the program is then made.

At program point 260, the global variable is incremented. At program point 265, the question is asked whether the value of the global variable is equivalent to the value of the constant. If so, then a jump to program point 270 is made; if not, an exit from the program is made. At program point 270, the evaluation unit 5 causes the second switch 40 and the switch 150 to switch over to their respective second switch position 90, 160, if this second switch position 90 has not already been established. At program point 275, the power supply of the mixer 15 is reduced by the evaluation unit 5 to the second predetermined value, if the power supply of the mixer 15 has not already been set to that value. At program point 280, the second filter configuration 105 is switched into the transmission path by means of the second switch position 175 of the third switch 165, or if active filters are used, whichever filter configuration 100, 105 consumes less current is used. An exit from the program is then made.

The first switch 135 and the fifth switch 180 are embodied noncontrollably, in contrast to the second switch 40, third switch 165, and fourth switch 150. The switchover of the first switch 135 and the fifth switch 180 is also not effected by the evaluation unit 5 but instead occurs upon connection of the radio apparatus 95 to the second receiving antenna 115 or to the external power supply or to the power supply adapter 110, for instance of the car radio, to which end the two switches 35, 180 are advantageously embodied as pressure contacts. If the radio apparatus 95 is disconnected from the car radio, the two switches 135, 180 then resiliently return to their first switch position 140, 185 for the connection of the first receiving antenna 35 or of the battery 55. The establishment of the operating mode for test purposes, which leads to optimized reception conditions and is established for instance by actuating the pushbutton switch 30, can also be used for normal operation, in order to prevent generally poor intelligibility caused by erroneous bursts.

An operating menu may also be provided on the radio apparatus 95, by means of which the user can choose whether he places more value on good reception quality or on a long service life of the battery 55. This choice can be stored in a memory of the radio apparatus 95, not shown in FIG. 1 and connected to the evaluation unit 5, and can also be monitored as a condition for establishing the operating mode for test purposes.

A chip card to be inserted into the insertion slot 20 can also be programmed such that the evaluation unit 5 is made to operate the radio apparatus 95 with the least possible current at all times, including at the expense of reception quality. Finally, it is also conceivable that each user is given what he prefers in terms of the reception quality of the receiver part 1 and the supply life of a battery charge in accordance with a suitably programmed chip card for insertion into the insertion slot 20, so that the reception quality of the receiver part 1 of the radio apparatus 95 can be adjusted individually for each user. By suitably programming the chip cards, a service provider can also set variably high fees for different levels of reception quality.

If the power supply of the mixer 15, or in other words its operating point, is increased, the result is a mixer characteristic curve in which intermodulation products in the useful frequency range are reduced, and as a result, the attendant influence of interference in the received useful signals is reduced. In the exemplary embodiment described, the evaluation unit 5 has a plurality of opportunities for intervention in order to adapt the sensitivity and/or the signal-to-noise ratio of the receiver part 1 to reception conditions or test conditions. The power consumption is not relevant then if a chip card has been introduced into the insertion slot 20, for instance for test purposes. In that case, it is not normal telephone operation that is involved but rather a test operating mode. The sensitivity and/or signal-to-noise ratio of the receiver part 1 is therefore increased to the maximum value.

In normal operation, a differentiated procedure is realized. If a previously received burst was bad, the sensitivity of the receiver part 1 is first increased, by adding the power-consuming reception amplifier 10. If this provision is unsuccessful, as indicated by the fact that erroneous reception of the burst again occurs within the specified time, then the intermodulation strength is improved by increasing the operating point or the power supply of the mixer 15. If even this provision does not lead to the desired success, one skilled in the art can employ further provisions known to him for increasing the sensitivity and/or signal-to-noise ratio of the receiver part 1, such as adding whichever filter configuration 100, 105 is better suited to the particular reception situation, or other provisions not however described in this exemplary embodiment. Only after the time specified by the constant has elapsed with error-free reception having occurred are the power-consuming provisions mentioned rescinded, in order to save power. If by then the reception conditions have still not improved, then once again a maximum of three bursts are lost by erroneous reception until a switchover is again made to maximum sensitivity and/or signal-to-noise ratio of the receiver part 1.

The invention is not limited to radio apparatuses for mobile radio but instead can be employed in all radio traffic applications, such as in cordless telephones, for instance, as well.

What is claimed is:

1. A radio apparatus for mobile radio, comprising a receiver part provided with an evaluation unit which controls said receiver part as a function of a predeterminable signal reception quality and an actual signal reception, said evaluation unit being formed so that in an event of defective signal reception said evaluation unit increases a parameter selected from the group consisting of a sensitivity, a signal-to-noise ratio, and both of said receiver part, said evaluation unit being formed so that in an event of error-free signal reception for a predetermined time, said evaluation unit lowers said at least one parameter of said receiver part, and wherein in the event of further defective signal reception, said evaluation unit again increases said parameter of said receiver part.

2. The radio apparatus as defined in claim 1, wherein said evaluation unit is formed so that it increases said at least one parameter of said receiver part in an event of neighboring channel disturbance or intermodulation.

3. The radio apparatus as defined in claim 1, wherein said receiver part includes at least one add-on reception amplifier, so that said evaluation unit adds said at least one reception amplifier in an event of defective signal reception and bypasses it in an event of error-free signal reception.

4. The radio apparatus as defined in claim 1, wherein said receiver part has at least one mixer, said evaluation unit being formed so that in an event of defective signal reception said evaluation unit increases a power supply of said at least one mixer to a first predetermined value and in an event of error-free signal reception said evaluation unit reduces it to a second predetermined value.

5. The radio apparatus as defined in claim 1, wherein said receiver part includes at least one first filter configuration and one second filter configuration, so that said evaluation unit adds one of said filter configurations in which a higher signal-to-noise ratio of said receiver part is assured.

6. The radio apparatus as defined in claim 1, wherein said evaluation unit is formed so that in an operating mode it provides at least one operation selected from the group consisting of adding at least one reception amplifier in said receiver part, increasing a power supply of a mixer of said receiving part to a first predetermined value, and switching over to one of filter configuration of said receiver part in which greater signal-to-noise ratio of said receiver part is assured.

7. The radio apparatus of claim 1, wherein the parameter is lowered so that energy is saved.

8. The radio apparatus as defined in claim 1, wherein said evaluation unit is formed so that in an operating mode said evaluation unit increases said at least one parameter of said receiver part to a maximum value.

9. The radio apparatus as defined in claim 8; and further comprising means forming an insertion slot for a chip card and a card reader, so that the operating mode can be established as a function of the chip card detected in said insertion slot by said card reader.

10. The radio apparatus as defined in claim 8; and further comprising a push button switch by which the operating mode can be established.

11. The radio apparatus as defined in claim 8; and further comprising a data processing unit; and an interface provided for connecting said data processing unit, so that the operating mode is established as a function of data transmitted to the radio apparatus via said interface.

12. The radio apparatus as defined in claim 8; and further comprising means receiving a request by a base station, so that the operating mode can be established as a function of the request by the base station.

13. The radio apparatus as defined in claim 12; and further comprising means for sending back a signal sent previously to the radio apparatus.

14. The radio apparatus as defined in claim 8; and further comprising an external power supply formed so that the operating mode can be established upon detection of said external power supply.

15. The radio apparatus as defined in claim 14; and further comprising an additional element selected from the group consisting of a power supply adaptor and a connected external antenna, so that the operating mode is established upon detection of said external power supply through said additional element.

16. The radio apparatus as defined in claim 8; and further comprising a sensor arranged so that the operating mode is established as a function of a measured value ascertained by said sensor.

17. The radio apparatus as defined in claim 16; and further comprising a battery connected to the radio apparatus, said sensor being formed so as to detect a change of said battery, so that the operating mode is established as a function of the charge of said battery detected by said sensor.

* * * * *